Figure 1:
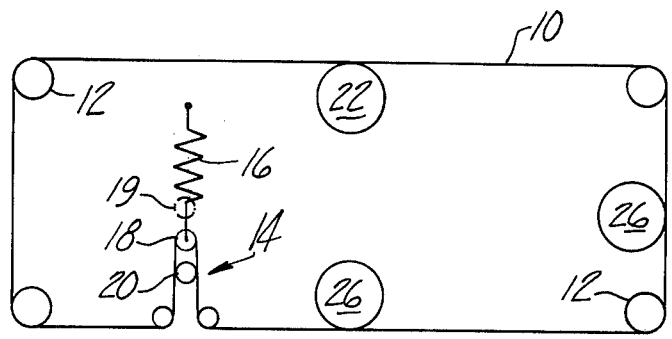

United States Patent [19]

Hull

[11] 4,032,003

[45] June 28, 1977

[54] HYDROSTATIC CONVEYOR DRIVE

[75] Inventor: James S. Hull, Waterford, Mich.

[73] Assignee: Melvin Corporation, Bay City, Mich.

[22] Filed: Apr. 30, 1976

[21] Appl. No.: 682,137

[52] U.S. Cl. .............................. 198/855; 60/445; 198/832

[51] Int. Cl.² .......................................... B65G 23/32

[58] Field of Search .......... 198/832, 834, 835, 854, 198/855, 856; 60/445

[56] References Cited

UNITED STATES PATENTS

| | | | |
|---|---|---|---|
| 2,057,173 | 10/1936 | Waalkes | 198/855 |
| 2,128,795 | 8/1938 | Bishop | 198/855 |
| 2,143,147 | 1/1939 | Ferris | 198/854 |
| 2,395,599 | 2/1946 | Webb et al. | 198/855 |
| 2,625,257 | 1/1953 | Schenk | 198/855 |
| 2,744,618 | 5/1956 | Seal | 198/834 |
| 3,500,989 | 3/1970 | Cripe et al. | 198/854 |
| 3,500,990 | 3/1970 | Vogt et al. | 198/854 |

*Primary Examiner*—Evon C. Blunk
*Assistant Examiner*—Jeffrey V. Nase
*Attorney, Agent, or Firm*—Fisher, Gerhardt & Groh

[57] ABSTRACT

A conveyor drive system employing a constant speed master drive and a slave drive of the hydrostatic, closed loop type in which there are no electrical or hydraulic feedback lines between the master and slave drive unit. The master drive moves the conveyor at a constant speed as load varies and the slave drive unit responds to changes in load on the conveyor to vary the speed of the drive to maintain a constant pull on the conveyor to insure that the slave drive shares its portion of the load with the master drive.

18 Claims, 2 Drawing Figures

HYDROSTATIC CONVEYOR DRIVE

This invention relates to endless conveyor drive systems and more particularly to such systems having two or more drive units each of which pulls its proportionate share of the load on the conveyor.

Prior conveyor drive systems whether employing electrical or hydraulic components have required complex interconnected feedback circuits in an attempt to synchronize the several drives to operate at the same speed in an effort to insure that the drives share the load of the conveyor equally. The problem of controlling the drives is compounded in conveyor systems because the work required of the drives varies as load is added or removed from a conveyor system. Moreover such systems often are many thousands of feet in length so that the power required of a drive for even an empty conveyor is a factor of great consequence.

It is an object of the invention to provide a conveyor drive system including a master drive unit and one or more auxiliary or slave drive units in which the slave drive units respond solely to conveyor movement or load to control the slave drive to insure that it supplies the desired amount of driving force to the coneyor.

It is another object of the invention to provide a conveyor drive system employing multiple drive units in which the units are capable of automatic speed adjustment to maintain a predetermined driving force on the conveyor.

Another object of the invention is to provide a conveyor driving system employing multiple drive units in which each of the drive units does its proportionate share of the work of moving the conveyor and its load.

A conveyor drive system is provided in which a master drive moves a conveyor at a constant speed independent of the conveyor load and a separate and independent slave drive unit is connected to the conveyor for moving the conveyor with a constant pull independently of variations of load on the conveyor so that the slave drive unit shares its portion of the load. This is accomplished by a control for varying the output volume of a variable displacement pump in response to pressure at the upstream side of the hydraulic motor of the slave drive unit which is connected to the conveyor.

Figure 2:
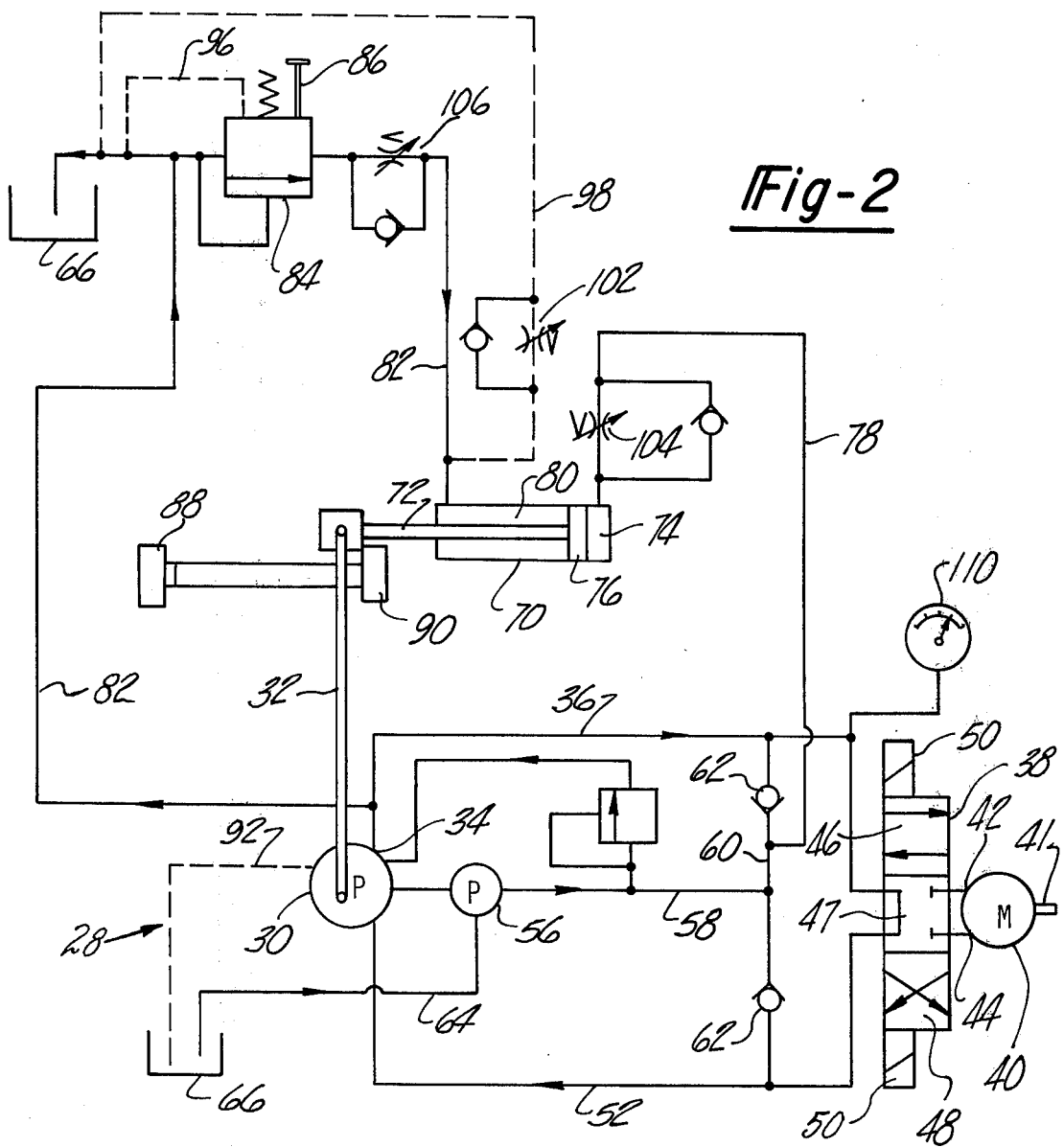

FIG. 1 is a diagrammatic connection of a conveyor drive system showing a master and slave drive units embodying the invention; and FIG. 2 is a schematic diagram showing the hydraulic circit forming the slave drive unit of the present invention.

The conveyor drive system embodying the invention is shown schematically as used with an endless conveyor or chain 10 which may be trained around a plurality of idler sprockets 12 to move in a path having various configurations throughout a conveying area such as a factory. Because such conveyor systems often are of a very great length and are subjected to variable loads and temperatures, the conveyor arrangements are normally provided with a take up section indicated at 14. The take up section 14 is for the purpose of accommodating changes of length in the conveyor 10 by biasing the conveyor 10 to maintain a constant tension through means of a spring 16 urging an idler sprocket 18 between the extreme limits of the positions indicated at 19 and 20.

The conveyor 10 is driven by a master drive unit 22 which may be of any form which will serve to move the conveyor 10 at a constant speed regardless of conveyor loading. Such master drives 22 may be either electrical or hydraulic. In the case of hydraulic drives for this purpose, they are of the type identified as constant speed-variable pressure drives or power sources. The master drive unit 22 may be of variable speed, but once the speed of movement of conveyor is selected it is maintained at a fixed rate regardless of conveyor loading.

At the desired speed of the conveyor 10, the take up section is adjusted so that the idler sprocket 18 is substantially midway between its extreme positions indicated at 19 and 20. If for some reason the master drive 22 should increase in the speed to increase the tension in the flight to the left of the drive 22, the idler sprocket 18 will move towards the position 20. Similarly, if the speed of the drive 22 should diminish, it may be possible for the idler sprocket 18 to move toward the position 19. In either of the extreme positions 19 or 20, it is customary to employ control circuits which will terminate operation of the master drive 22 until the necessary corrective adjustments have been made to the master drive unit 22 or to the take up section 14.

The conveyor system also employs one or more slave drive or auxiliary drive units 26, the number and location of which is determined by the length and expected loading of the conveyor 10. The slave drive units 26 may be generally classified as hydrostatic drives or transmissions of the closed circuit or closed loop type.

Referring now to FIG. 2, the slave drive includes a hydrostatic drive system 28 having a pump 30 of the variable displacement and unidirectional type which preferably is driven at a uniform speed by an electric motor (not shown).

The pump 30 includes a movable control member 32 which is connected to the usual swash or wobble plate of the variable displacement pump. Movement of the control member 32 in opposite directions changes the angle of the swash plate to increase or decrease the output of the pump at the output port 34. The pump 30 is connected through its port 34 to a supply line 36 connected through a control valve 38 to a motor 40.

The motor 40 of the hydrostatic transmission 28 is of the fixed displacement, bi-directional type hving an output shaft indicated at 41 for driving connection to the conveyor 10. The motor 40 has a pair of ports 42 and 44, one of which acts as the intake and the other as the discharge port depending on the positioning of the four-way control valve 38.

The four-way valve 38 is of conventional type and may be moved to any of its three positions indicated at 46, 47 and 48 by solenoids 50. In the position shown in the drawings, the valve 38 is effective to bypass hydraulic fluid delivered by the pump 30 to the supply line 36 back through a return line 52 to the pump 30 so that the motor 40 is bypassed. Upon actuation of one of the solenoids 50 to move the valve 38 to the position 46, the port 42 of the motor becomes the inlet and the motor is driven in one direction and upon actuation of the other solenoid 50 to move the valve 38 to the position indicated at 48, the motor port 44 becomes the inlet and the motor 46 is driven in the opposite direction.

The hydrostatic drive 28 also includes the conventional fixed displacement pump 56 which serves to charge the hydrostatic drive with hydraulic fluid to replace any fluid lost through leakage during operation of the system. The charging pump 56 may be driven by the same electric motor driving the pump 30. The charging pump 56 serves to maintain a minimum low pressure such as 180 p.s.i. in an output line 58 connected to a branch line 60 and through check valves 62 to the delivery line 36 and return line 52. The delivery line 36 and return line 52 form the main or closed loop of the hydrostatic drive 28. The charging pump 56 is connected by an intake line 64 to a reservoir 66 from which the necessary supply of hydraulic fluid is obtained for charging the system of the hydrostatic drive.

The output of the pump 30 is under the control of the control member 32, the angle of which determines the angle of the swash plate. The angle of the control member 32 is varied under the influence of a linear hydraulic actuator or stroking cylinder 70 having a piston rod 72 pivotally connected to the control member 32. A chamber 74 at one side of the piston 76 is connected through line 78 to the branch line 60 of the charging system of the hydrostatic drive 28. During operation of the system, the chamber 74 is subjected to the pressure which is continuously maintained in the branch line 60 to urge the control member 32 in a counterclockwise direction as seen in FIG. 2. A chamber 80 formed at the rod end of the hydraulic actuator 70 communicates with the delivery line 36 of the hydrostatic drive 38 through a line 82. A sequence valve 84 is disposed in line 82 and is of a type which may be manually adjusted by way of a handle 86. The sequence valve 84 may be adjusted so that at some selected pressure level, the line 82 becomes open to the passage of hydraulic fluid from the output or supply line 36 to the chamber 80 formed at the rod end of the hydraulic actuator 70.

Associated with the control member 32 are a pair of adjustable stops 88 and 90 by which the range of movement as well as the extreme end positions of the control 32 may be adjusted. Fluid pressure at the closed end of the actuator 70 and in the chamber 74 serves to continuously bias the piston rod 72 so that the control member 32 is urged toward the stop 88 in which position the pump 30 will deliver its maximum volume of hydraulic fluid to supply line 36.

Pressure in the rod end of the cylinder 70 or in the chamber 80 serves to bias the control member 32 to the right or towards stop 90 in which position the pump 30 delivers a minimum volume of hydraulic fluid to the supply line 36.

The pump 30 is provided with a drain line 92, the sequence valve 84 with a drain line 96 and the hydraulic actuator 70 with a drain line 98 all of which may be connected to a common reservoir indicated in several locations in FIG. 2 and designated 66. The line 98 is provided with a variable orifice 102 which serves to regulate the speed of movement of the actuator and the control member 32 towards the stop 88. Similarly, a variable orifice valve 104 is located in the line 78 to regulate the speed at which the actuator 70 can move the control member 32 in the opposite direction, that is, towards the stop 90.

It will be noted that the slave drive unit 26 is self-contained and has no hydraulic or electrical feedback systems to the master drive 22 to synchronize speed with the master drive 22. If desired, however, an electrical connection may be made to the solenoids 50 to correspond with similar controls at the master drive 22 to insure that both the master and slave drive units are operating in the same direction.

Operation of the slave drive system 26 is based on the principal that pressure in the driving system is directly proportional to load on the conveyor and the pressure is maintained at a predetermined uniform level to maintain a constant uniform pull on the conveyor. In order to maintain the pressure constant the output of the pump 30 is varied. With the four-way valves 38 in a position shown in FIG. 2, pressure from the charging pump 56 will be established in the chamber 74 so that the piston 76 is moved to the left and the stroking control lever 32 will be moved towards the adjustable stop 88. In this position the pump 30 will operate at its maximum speed to circulate hydraulic fluid through the valve 38 and in the closed main loop made up of the lines 36 and 52. Upon movement of the four-way valve 38 to position 46 and 48, hydraulic fluid in the line 36 will be delivered to the motor 38. As soon as the motor 40 is subjected to load, the pressure in the line 36 will increase and will be established by way of the line 82 to sequence valve 84. When the pressure increases to the predetermined level selected at the sequence valve 84, it will open and pressure will be established in the chamber 80 of the hydraulic actuator 70. Pressure in chamber 80 will act against the pressure in chamber 74 to move the stroking control lever 32 to the right to reduce the output of hydraulic fluid from pump 30 to the line 36 with a consequent reduction of speed of the motor 40. As the volume of output of the pump 30 is reduced, pressure in chamber 80 will be reduced to permit the stroking lever 32 to return towards the left to again increase the output of the pump. In actual practice, once the slave drive unit 26 is properly adjusted, changes in the position of the linear hydraulic actuator 70 will be occurring continuously and a gauge 110 in the output line 36 will read a constant pressure.

The only connection between the master drive 22 and the slave drive system 26 is the conveyor itself. The motor 40 will pull the conveyor 10 at a constant tension which requires a constant pressure level in the main loops 36 and 52. If the tension on the conveyor 10 is reduced, for example, by removing a substantial portion of the load which it is carrying, the motor 40 will sense the load reduction which results in a corresponding instantaneous and momentary pressure decrease in the main loop. The pressure decrease will be made manifest in the chamber 80 so that the stroking lever 32 will move to the left to increase the output of the pump 30 and therefore the speed of the motor 40 so that the established tension or pull on the conveyor 10 will be reestablished. Correspondingly if an increased load is placed on the conveyor 10, the motor 40 will sense the increased load as an increase in pressure which will be established in the line 36, line 82 and the chamber 80 to urge the stroking lever 32 in a clockwise direction or to the right so that it approaches the stop 90 to decrease the output of the pump 30. As a result of decreased volume to the line 36, the speed of the motor 40 will decrease until the predetermind pressure is reestablished in the line 36. As previously pointed out, the changes occur so rapidly that during normal operations the gauge 110 in line 36 will indicate a constant pressure value.

When the linear hydraulic actuator 70 is moving to the right to decrease pump output, the rate of movement can be controlled by a variable orifice control indicated at 104. Similarly, when the piston rod 72 is moving in the opposite direction under the influence of the pressure in the chamber 74 the rate of movement is controlled by a variable orifice control indicated at 102. If desired a variable orifice 106 may also be located in the line 82 between the sequence valve 84 and the chamber 80.

As previously pointed out, the master drive unit 22 may be either electrical or hydraulic and of a type to deliver constant speed regardless of conveyor loading. If the master drive is a hydraulic unit it would be classified as a constant speed-variable pressure power source. By contrast, the slave drive system 26 which continuously changes speed to maintain a constant pressure or chain pull would be considered a constant pressure-variable speed power source.

The gauge 110 in the line 36 and the manual control 86 at the sequence valve 84 is all that is required by way of manual control to bring the slave drive unit 26 into synchronized operation with the master drive. Once the proper adjustment has been made it will remain adjusted unless some other speed is selected for the master drive unit 22.

To adjust the slave drive system 26 and assuming that the master drive 22 is operating at a selected constant speed so that the takeup sprocket 18 is disposed in an intermediate position in the takeup section 14, the manual control 86 of the sequence valve 84 is adjusted so that the pressure indicated at the gauge in the line 36 is substantially equal to the pressure of the master drive unit 22 if the latter is a hydraulic system. If the master drive is an electrical system it may be necessary to correlate amperage of the master drive 22 with the pressure of the slave drive unit 26. In actual practice the pressure in the main loop of the slave drive unit will be slightly higher than in an hydraulic master drive. Once a pressure level is established for a speed of the motor 40 which is equal to the speed of the master drive, that pressure will be maintained during all subsequent operations of the conveyor and as previously pointed out the hydraulic actuator 70 and stroking control lever 32 will be constantly moving to change the output volume of the pump 30 so that the pressure as indicated at the gauge 110 will remain constant.

The operation of the slave drive unit 26 is the same in either direction of movement of the conveyor 10. Although conveyors are customarily driven in one direction it is sometimes desirable to reverse the direction for the purpose of maintenance. In the present embodiment of the invention such reversal is obtaned by reversing the direction of the master drive 22 and the slave drive units 26 simultaneously.

More than one slave drive unit 26 can be used to drive the conveyor 10 and this is accomplished without having any feedback circuits between the various slave drive units 26 and the master drive unit 22 except for the purpose of insuring that rotation is in the same direction for all drives.

A conveyor drive system has been provided in which one or more slave drive systems may be used with a master drive unit so that all of the units operate to share their proportion of the load on a conveyor 10. Moreover, the slave drive units 26 require no feedback connection of any kind to the master drive unit and control of the slave drive units is accomplished in response to the tension in th conveyor itself. The appropriate control is accomplished by maintaining the pressure in the closed circuit of a hydrostatic transmission at a constant level as load on the conveyor changes by correspondingly changing the volumetric output of a variable displacement pump forming part of the hydrostatic drive.

The embodiments of the invention in which an exclusive property or privilege is claimed are defined as follows:

1. In a conveyor drive system having a master drive for driving the conveyor at a constant speed independent of conveyor load, a slave drive system connected to said conveyor independently of said master drive for moving said conveyor in the same direction, said slave drive system including a closed circuit hydrostatic drive having a variable displacement pump delivering fluid in a supply line to a fixed displacement motor, control means for varying the displacement of said pump including a control member movable in one direction to increase the displacement and in the other direction to decrease the displacement of said pump, first means biasing said control member in said one direction with a uniform force, and second means connected to said control member to move the latter in said other direction to decrease the displacement of said pump and the speed of said motor in proportion to the pressure in said supply line.

2. The combination of claim 1 in which said first means includes a hydraulic cylinder connected to a source of constant pressure for movement in said one direction.

3. The combination of claim 2 in which said source of constant pressure is a fixed displacement pump forming part of the slave drive system.

4. The combination of claim 1 in which said second means includes a hydraulic actuator having a piston and a conduit communicating said actuator at one side of said piston with said supply line.

5. The combination of claim 4 and further comprising a sequence valve disposed in said conduit and being manually adjustable to open at a selected pressure level higher than the pressure of said constant source of pressure.

6. The combination of claim 1 and further comprising means for adjustably limiting the range of movement of said control member to determine the maximum and minimum displacement of said pump.

7. The combination of claim 1 and further comprising a hydraulic cylinder for moving said control member, said first means biaing said control member in one direction including a source of constant pressure communicating with one end of said hydraulic actuator, and said second means biasing said control member in the opposite direction comprising a conduit in communication with said supply line at the upstream side of said motor.

8. The combination of claim 7 and further comprising a sequence valve disposed in a line communicating with the upstream side of said motor and with said hydralic actuator whereby pressure is delivered to said hydraulic actuator when the pressure at said upstream side is in excess of the constant pressure acting at the other end of said hydraulic actuator.

9. The combination of claim 8 and further comprising a variable orifice disposed between said sequence valve and said hydraulic cylinder for adjustably controlling the speed of movement of said hydraulic cylinder in said one direction.

10. The combination of claim 8 and further comprising a variable orifice between said source of constant pressure and said hydraulic actuator for controlling the speed of said hydraulic actuator in said other direction.

11. The combination of claim 1 and further comprising a four-way reversing valve disposed between said pump and said motor and being movable to select the direction of rotation of said motor.

12. A conveyor drive system for maintaining a constant pull on a conveyor independently of load on the conveyor comprising, a closed circuit hydrostatic drive having a variable displacement pump, a fixed displacement motor connected to the conveyor, a supply line for delivering hydraulic fluid from said pump to said motor, a return line for delivering hydraulic fluid from said motor to said pump, control means movable to vary the displacement of said pump, actuating means connected to said control means to move the latter in proportion to the pressure in said supply line to vary the delivery of hydraulic fluid from said pump to said motor to vary the speed of said motor, said actuating means comprising a hydraulic cylinder, means biasing said cylinder in one direction with a constant force, and a fluid conduit communicating said cylinder with said supply line for moving said cylinder in the other direction in response to pressure in said supply line.

13. The combination of claim 12 and in which said actuating means includes a linear actuator having one end in fluid communicating with said supply line and the other end connected to a source of constant pressure, said source of constant pressure being operable to bias said actuating means in a direction increasing the speed of said motor and said cylinder being movable in the other direction to decrease the speed of said motor.

14. The combination of claim 12 in which said means biasing said cylinder with a constant force includes a source of pressure maintained at a constant level, said source of pressure communicating with said cylinder to urge the latter in said one direction.

15. The combination of claim 14 in which said constant source of pressure includes a charging circuit communicating with said supply and return lines to maintain the latter charge at a minimum pressure level.

16. The combination of claim 14 and further comprising a variable orifice disposed in said fluid conduit and a second variable orifice between said fluid cylinder and said constant source of pressure for adjustably controlling the speed of movement of said cylinder.

17. The combination of claim 12 and further comprising a reversing valve interposed in said supply and return lines between said pump and said motor and being movable to reverse the direction of said motor.

18. The combination of claim 12 and further comprising a sequence valve disposed in said fluid conduit and being manually adjustable to open at a pressure level to exert a force in excess of and in opposition to said constant force.

* * * * *

UNITED STATES PATENT OFFICE
CERTIFICATE OF CORRECTION

Patent No. 4,032,003            Dated June 28, 1977

Inventor(s) James S. Hull

It is certified that error appears in the above-identified patent and that said Letters Patent are hereby corrected as shown below:

Column 1, line 25, "coneyor" should read --conveyor--.

Column 1, line 58, after "of" delete --a--.

Column 4, line 56, "predetermind" should read --predetermined--.

Column 5, line 46, "obtaned" should read --obtained--.

Column 5, line 62, "th" should read --the--.

Signed and Sealed this

Twenty-fifth Day of October 1977

[SEAL]

Attest:

RUTH C. MASON  
*Attesting Officer*

LUTRELLE F. PARKER  
*Acting Commissioner of Patents and Trademarks*